Figure 1:
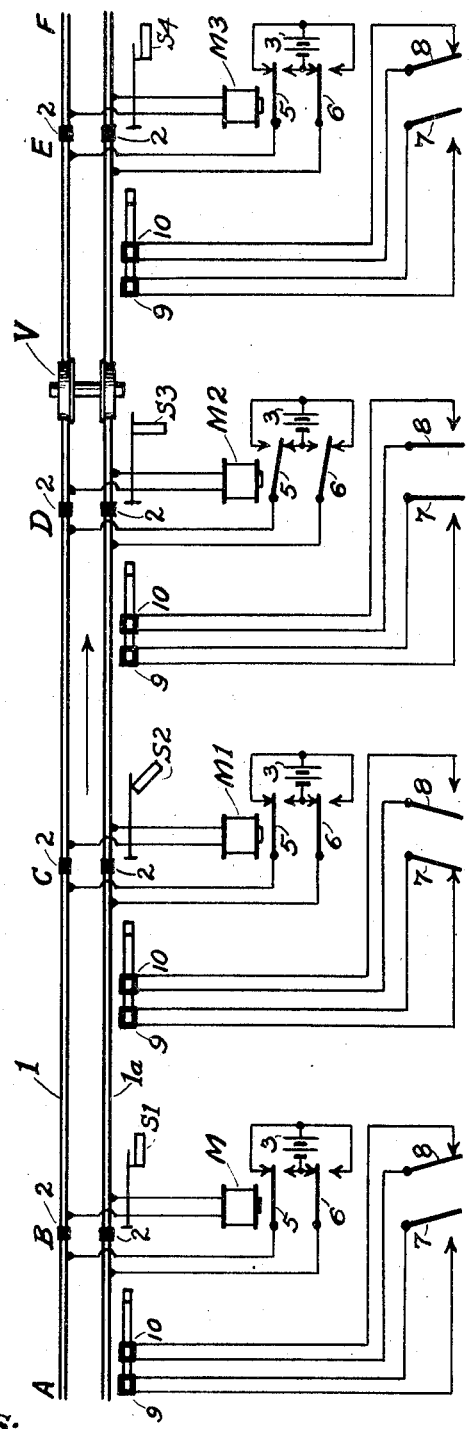

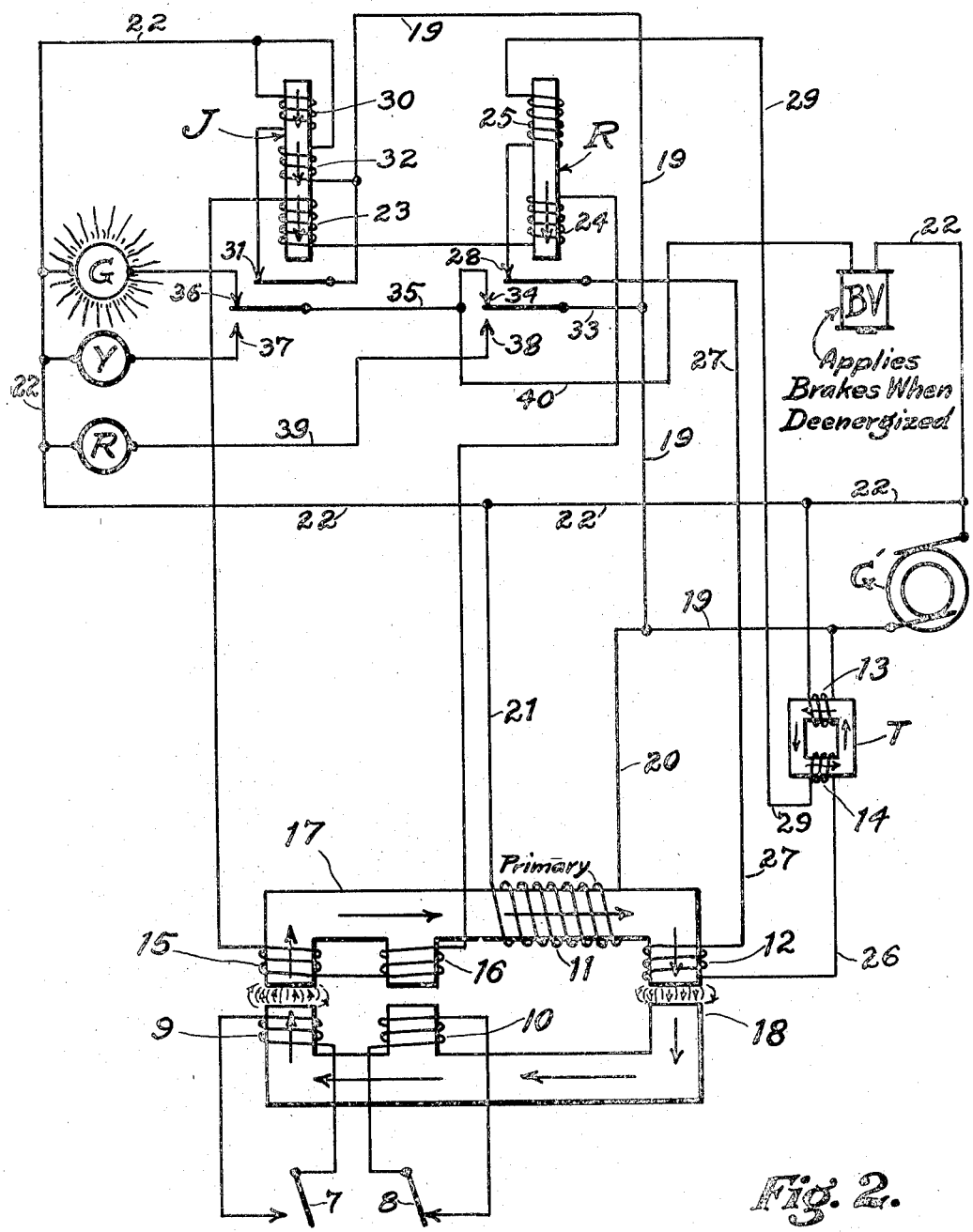

Patented Jan. 27, 1925.

1,524,455

UNITED STATES PATENT OFFICE.

HARRY W. RICHARDS, OF BALTIMORE, MARYLAND.

AUTOMATIC TRAIN-CONTROL APPARATUS.

Application filed January 28, 1924. Serial No. 689,013.

*To all whom it may concern:*

Be it known that I, HARRY W. RICHARDS, a citizen of the United States, residing at Baltimore city, State of Maryland, have invented new and useful Improvements in Automatic Train-Control Apparatus, of which the following is a specification.

My invention relates to apparatus for the control of brakes for railway cars or trains, and particularly to apparatus for automatically applying the brakes of a car or train when such car or train passes a point at which it should stop, such as when it passes a signal set at danger.

My invention is designed to provide a plurality of cab signals, indicating traffic conditions in advance, as well as an automatic brake control, consisting of simple and effective apparatus which requires no battery or other source of electrical energy on the roadside for its operation, other than that already in existence in connection with automatic block signals and certain other novel features of construction and arrangement hereinafter described.

The precise nature of my invention will best be understood by reference to the accompanying drawings forming a part of this specification, it being premised, however, that various changes may be made therein by those skilled in the art, without departing from the spirit and scope of my invention, as defined in the appended claims.

In the accompanying drawings, Figure 1 is a diagrammatic view of a section of railway track equipped with apparatus embodying my invention; and Figure 2 is a diagrammatic view showing the operative relation between the track system and the electrical equipment to co-operate therewith which is carried by the train.

Similar reference characters refer to like or similar parts.

Referring first to Figure 1, the reference characters 1 and 1ª designate the track rails of a railway over which traffic normally moves in the direction indicated by the arrow. These rails are divided by insulating joints 2 into a plurality of blocks.

Each block is provided with a track circuit comprising as usual the track rails of the block, a source of current connected to the rails at the exit end of the block, and a track relay connected across the rails at the entrance end of the block. As here shown, the source of current for each track circuit is a battery designated by the reference character 3, this battery being reversibly connected with the rails by the contacts of the track relays as hereinafter explained. The track relay shown for each block is of the polarized type, comprising two neutral contacts 5 and 6, and two polarized armature contacts 7 and 8. It follows, of course, that the polarized armatures 7 and 8 will be swung in one direction or the other according to the direction of the flow of current in the track circuit, and that the neutral armatures 5 and 6 of each relay will be raised or lowered according as the relay is energized or deenergized.

As shown, a vehicle V occupying track section DE will cause the track relay $M^2$ to be deenergized by the wheels and axle of the vehicle shunting the track circuit. Relay $M^2$ being deenergized the connections of its corresponding battery 3 to the track rails are reversed from normal. This will cause the polar contacts 7 and 8 of relay $M^1$ associated with the adjacent block section, CD to be swung to the left. As block section CD is unoccupied, track relay $M^1$ is energized and the polarity of the track circuit current in section BC is normal and the polar contacts of relay M are swung to the right. The polarized contacts 7 and 8 control the circuit through the windings 9 and 10, respectively, of a track device, so that the closing of one coil or the other will cause a current of a certain phase to flow through the vehicle relays, or should both windings be open no current will flow in the vehicle relay circuit, as hereinafter explained.

As shown in Figure 2, the track apparatus consists of two coils designated as 9 and 10 wound on a three-pole laminated structure of soft iron. The terminals of the coil 9 or 10 will be closed according as the polar armatures of the track relay are swung to the right or left.

When the locomotive device 17 passes over the track device, magnetic flux passes from the locomotive device through the pole 18 of the track device, returning to the locomotive structure through the coil 9 or 10, according as the coil 9 or 10 is open circuited.

Located adjacent the entrance end of each block is a roadside signal designated by the reference character S with an exponent corresponding to the location. Each of these signals, as here shown, is of the semaphore type adapted to indicate "stop", "caution"

or "proceed", according as the semaphore is in the horizontal, the inclined or the vertical position. The operation of these signals is in accordance with usual standard practice, and hence no explanation is necessary. As shown in the drawing, the block section DE is occupied by a vehicle V, so that signal S³ indicates stop, signal S² indicates caution, and signal S¹ indicates proceed.

The engine apparatus consists of the two secondary coils designated as 15 and 16, the secondary coil 12, and the primary winding 11, wound on a three-pole laminated structure of soft iron, and so arranged as to cooperate with the track coils 9 and 10. The primary coil 11 is constantly energized by the alternating current generator G′ by a circuit from the generator, through wires 19 and 20, primary coil 11, and wires 21 and 22 back to the generator. The magnetic flux produced by the primary coil 11 energizes the secondary windings 15, 16 and 12. The coils 15 and 16 are wound in opposite directions and having practically the same number of turns their voltages are equal and opposing, so that normally there is no current flowing in the circuit which includes the windings 23 and 24 of the vehicle relays J and R nor in the windings 15 and 16. The primary winding 13 of a closed core transformer T is continuously energized by means of an electrical connection across the leads 19 and 22, as shown, and the secondary winding 14 is connected in a circuit which includes the secondary coil 12 and the winding 25 of the vehicle relay R, the circuit being from the secondary 14 of the transformer T, through wire 26, secondary 12, wire 27, relay contact 28, coil 25, and wire 29 back to secondary 14. The voltage in the secondary 12 is somewhat less than the voltage in secondary 14 and the two secondaries are connected in opposition so that the normal voltage of the current energizing relay R will be the difference between the two voltages of the coils 12 and 14.

The winding 30 of relay J is continuously energized by a circuit from the generator through wire 19, the contact 31 of relay J, winding 30, and wire 22 back to the generator. The winding 32 of relay J is continuously energized by a circuit from the generator, through wire 19, winding 32, and wire 22 back to the generator, and the flux produced in the relay core by winding 30 is additive to the flux produced by winding 32, and the relay is adjusted so that the flux of both coils is required to hold the front contacts of relay J closed.

Current is supplied by the generator G through wires 19 and 33 to the armature of relay R, through front contact 34, wire 35, to armature of relay J, through front contact 36, or back contact 37, and the green or yellow light, according to the position of the armature, and returning through wire 22 to the generator. When relay R is de-energized, the circuit to the green or yellow light is opened, and a circuit is established from the generator, through wires 19 and 33, back contact 38, wire 39, through the red light and back to the generator through wire 22. Current is supplied to the brake valve magnet BV, by a circuit from the generator through wires 19 and 33, contact 34, wire 40, and the brake valve magnet BV back to generator through wire 22. The magnet BV may be arranged to control any desired form of air brake apparatus, so as to cause an application of the brakes when the magnet is deenergized. The relays J and R are provided with any suitable devices, not shown, which may be of the well known form commonly used and under the control of the engineer of the train and by means of which the said relays may be restored after they have become de-energized.

The operation of the device at a clear signal is as follows:—

The track relay M being normally energized, the polarized armatures 7 and 8 are normally swung to the right, as shown in Figure 1. Therefore, when the vehicle device 17 passes over the track device 9, 10 and 18 associated with said clear signal, the track device forms a path of low reluctance for the flux produced by the primary coil 11, so that the flux passing through the vehicle structure 17 will be greatly increased, all as will be readily understood from Fig. 2. But the circuit through the track coil 10 being closed at the contact 8, the flux entering the pole 18 cannot pass up through coils 10 and 16, so the entire flux is compelled to return to the vehicle structure through the open coil 9 and the vehicle coil 15. In such case, the magnetic circuit is from the primary coil 11, through coil 12, through the air gap associated with coil 12 to pole 18, through coil 9, the air gap associated with coil 9, through coil 15, and through the structure 17 back to the primary coil 11, as indicated by the arrows. The passing of the flux through coil 15 increases the voltage in that side of the circuit thereby causing a current to flow through the relay windings 23 and 24 in a direction corresponding to the flux indicated by the arrows. The flux thus produced by the winding 23 is additive to that of the windings 30 and 32, so that relay J will be held energized and the contacts 31 and 36 held in their closed positions. The passing of the flux through the secondary coil 12 also increases the voltage in this coil so that it becomes practically equal to the voltage from the secondary 14 of the transformer T, and being in opposition thereto the voltage in the circuit containing said coils 12 and 14 drops to zero, so no current will flow in the winding 25 of relay R. There being current in winding 24, however, the relay R will be held energized and the contacts 28 and 34 held in their closed positions. Both relays J and R being thus energized, the vehicle circuits are maintained closed to the green cab light G and to the brake valve magnet BV, with the result that said green light is shown, but no brake application is made for such action only occurs when the magnet BV is deenergized.

When the vehicle reaches a caution signal, it is in a block section adjoining that of the vehicle V, and in such case, although the relay M¹ is energized, yet the current flows therethrough in a direction opposite to that of the current flowing through relay M, for the contacts 5 and 6 associated with the relay M² a head of the relay M¹ are reversed due to the presence of the vehicle V, all as explained above. It thus results that the polarity of the relay M¹ is reversed, and the polarized contacts 7 and 8 associated with said relay M¹ are thrown to the left as seen in Fig. 2. This position of said last named contacts 7 and 8 causes the circuit of the track coil 9 to be closed, and the circuit of the coil 10 to be open, thereby causing the flux in the track structure to return to the vehicle structure through the coils 10 and 16. This causes the voltage to be increased in secondary coil 16 and a current to flow through the relay windings 23 and 24 in a direction opposite to that received at a clear signal. The flux of winding 23 will now oppose that of windings 30 and 32, reducing the flux in the relay core so that the relay J will be deenergized, but the current being supplied to winding 24 will cause relay R to be still held energized. When relay J is deenergized, the circuit to the green light G is opened and a circuit to the yellow light Y is established. Contact 31 being open there will be no current in winding 30 when the vehicle device passes off the track device, thus causing relay J to remain open. Relay R on the other hand being held energized no brake application takes place, for the magnet BV remains energized.

When the vehicle reaches a stop signal, the track relay M² is deenergized, and the polarized armatures 7 and 8 associated therewith are in position where both contacts 7 and 8 are open. The flux passing through the track structure in this condition returns to the engine structure with an equal amount passing through the coils 15 and 16, thereby increasing the voltage in both opposing coils 15 and 16 by an equal amount, so that the voltage in the two sides of the circuit being equal no current will flow through the windings 23 and 24. There being no current in windings 24 and 25 (the reason for de-energization of 25 has been already explained), relay R will be deenergized, thereby opening the circuits to the green and yellow cab signals and to the brake valve magnet BV, thus causing an application of the brakes. In this case, there is also established a circuit through the back contact 38 of relay R to the red cab signal. Contact 28 now being open there will be no current in winding 25 when the vehicle passes off the track device and relay R will remain deenergized.

From what has now been disclosed, it will be clear that when the track is clear of danger, the signals S¹, S², S³, etc., will all be at such a position as to indicate no danger and the green light G will be shown in the cab. When a block section is entered, however, which is next to a block section that is occupied by a vehicle, the signal associated with the entered section will indicate caution, and a yellow light Y will appear in the cab. On the other hand, when a vehicle enters a block section that is already occupied by another vehicle, the signal associated with said occupied section will indicate stop, a red light will appear in the cab and the brakes will be automatically applied.

From the above description, it will be understood that the embodiment of the invention may be in various forms as regards its form, detail construction and organization of parts, without departure from the principle of construction shown or the scope of the appended claims.

Having thus described my invention, I claim:—

1. In a train controlling system, a primary coil on the vehicle continuously energized by alternating current, secondary coils on the vehicle of nearly equal voltages and connected in opposition in a closed circuit, a relay on the vehicle adapted to be energized by an increase of voltage in said secondary circuit; a second closed circuit on the vehicle including secondary coils of unequal voltages and connected in opposition, a relay on the vehicle normally energized by the difference between the voltages; an armature on the roadway adapted to form a path of low reluctance for the flux of the primary vehicle coil as the vehicle moves past said armature, coils on the armature, and means for closing a circuit through one or the other of said coils to control the path of the magnetic flux through the armature, thereby increasing the voltage in the secondary vehicle coils in accordance with different track conditions.

2. In a train controlling system, a primary coil on the vehicle continuously energized by alternating current, secondary coils on the vehicle connected in opposition in a closed electric circuit, relays on the vehicle adapted to be operated by the difference between the voltages of said secondary coils, a brake control magnet on the vehicle; an armature on the roadway adapted to form a path of low reluctance for the flux of the primary vehicle coil as the vehicle moves past said armature, coils on the armature, and means under traffic control for closing a circuit through one or the other of said coils to control the path of the magnetic flux through the armature, thereby increasing the voltage in the secondary vehicle coils in accordance with different track conditions.

3. In a train controlling system, a primary coil on the vehicle continuously energized, secondary coils on the vehicle connected in opposition, relays on the vehicle adapted to be operated by the difference between the voltages of the currents in said secondary coils, a brake control magnet on the vehicle; armatures on the roadway adapted to form a path of low reluctance for the flux of the vehicle coils each time the vehicle moves past one of the armatures, coils on the armatures, and means under traffic control for closing a circuit through one or the other of said coils to control the path of the flux through the armatures in accordance with different track conditions.

4. In a train controlling system, a primary coil on the vehicle continuously energized, secondary coils on the vehicle connected in opposition, relays on the vehicle adapted to operate in accordance with the current in said secondary coils; armatures on the roadway adapted to form a path of low reluctance for the magnetic flux of the vehicle coils each time the vehicle moves past one of said armatures, and coils on the armatures adapted to control the path of the flux through the armatures, thereby increasing the current in certain of the vehicle coils in accordance with different track conditions.

5. In a train controlling system a primary coil on the vehicle continuously energized; secondary coils on the vehicle associated with said primary coil and connected in opposition; relays on the vehicle controlled by the currents in said secondary coils; a plurality of insulated block sections constituting a track for said vehicle; an armature associated with each block section over which said vehicle coils may pass and forming a path of low reluctance for the magnetic flux of said vehicle coils; and magnetic means associated with each armature adapted to control the path of said flux through said armature.

In testimony whereof I affix my signature in the presence of two witnesses.

HARRY W. RICHARDS.

Witnesses:
A. G. FREEDOM,
LEE S. MEYER.